(No Model.)

H. F. POOL.
PIPE TRAP.

No. 545,307. Patented Aug. 27, 1895.

Witnesses
R. S. Bacon
G. Arthur Pennington

Inventor
Howard F. Pool
By his Attorneys
E.K. & B. Phillips

UNITED STATES PATENT OFFICE.

HOWARD F. POOL, OF LYNN, MASSACHUSETTS.

PIPE-TRAP.

SPECIFICATION forming part of Letters Patent No. 545,307, dated August 27, 1895.

Application filed March 15, 1894. Serial No. 503,734. (No model.)

*To all whom it may concern:*

Be it known that I, HOWARD F. POOL, a citizen of the United States, and a resident of Lynn, in the county of Essex and Commonwealth of Massachusetts, have invented a new and useful Pipe-Trap, of which the following is a specification.

My invention relates to that class of the above-named devices having a receiving and discharge pipe, the adjacent ends of which are connected by a suitable curved connection, which, when the trap is in place, extends below the receiving and discharge pipes, and, remaining wholly or partially filled with liquid, prevents the flow of gas through the trap.

My invention consists in laterally off setting the adjacent ends of the receiving and discharge pipes and placing suitable cleaning-ports in line therewith.

The object of my invention is to furnish a device for cleaning the trap and lines of pipe connected therewith and removing obstructions therefrom.

My invention is illustrated by the drawings submitted herewith, in which—

Figure 1:
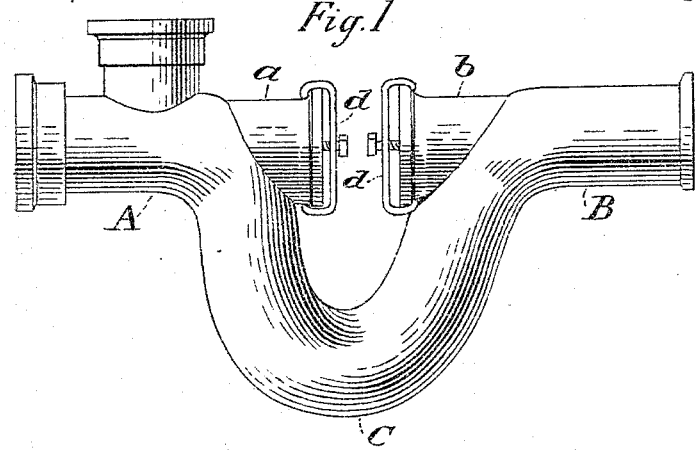
Figure 2:
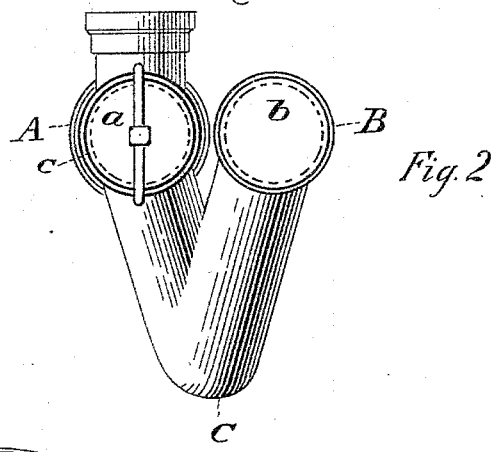
Figure 3:
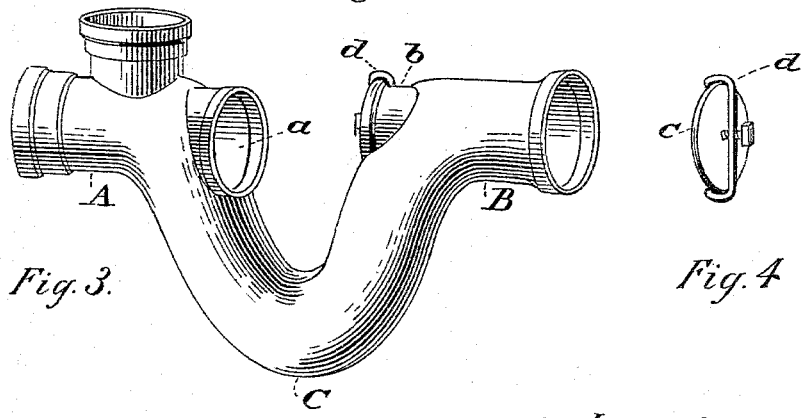
Figure 4:
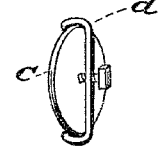

Figure 1 is a side view of a trap embodying my invention. Fig. 2 is an end view of same. Fig. 3 is a perspective view of same. Fig. 4 is a detached view of device for closing the cleaning-ports.

Similar letters of reference refer to similar parts in the several views.

In the drawings, A represents the receiving-pipe, and B the discharge-pipe. In the form of my invention shown in the drawings the adjacent ends of pipes A and B are connected by a substantially U-shaped pipe C, which is so bent in the lower curve of the U that the adjacent ends of the pipes A and B are set off laterally from each other, the pipes A and B being brought wholly or partially into different vertical planes. (See Figs. 2 and 3.)

In traps of this class, as hereinbefore stated, the curved portion C, when the trap is in use, extending downward, remains wholly or partially filled with liquid and prevents the flow of gas through the trap. In my improved trap the curved portion C may be of any suitable shape for the purpose above set forth, provided that the adjacent ends of the pipes A and B are laterally set off from each other.

The receiving-pipe A, the discharge-pipe B, and their connection C may be made integral, forming a continuous pipe.

Again referring to the drawings, $a$ and $b$ represent suitable cleaning-ports, the port $a$ being placed in line with the receiving-pipe A and the port $b$ in line with the discharge-pipe B. The arrangement of the ports $a$ and $b$ is such (the adjacent ends of pipes A and B being set off as hereinbefore described) that a straight rod may be inserted through the same into either of the pipes A and B and through the same into the line of pipe connecting therewith as far as its alignment will permit. When not in use, the ports $a$ and $b$ may be closed by movable covers $c\,c$, which may be conveniently secured in position by suitable clamps $d\,d$, or other suitable device.

My improved trap may be used for any of the purposes for which traps of such class are adapted, and, having hereinbefore fully described the form and function of its distinctive features, I now claim as novel and desire to secure by Letters Patent—

In a pipe trap the combination of a receiving and a discharge pipe, the adjacent ends of which are arranged laterally out of alignment, a downwardly and laterally bent trap section, openings in the adjacent ends of the receiving and discharge pipes and removable covers for said openings all substantially as described.

In testimony whereof I have hereunto set my hand, in presence of two attesting witnesses, this 12th day of March, 1894.

HOWARD F. POOL.

Witnesses:
BENJ. PHILLIPS,
A. E. WHYTE.